UNITED STATES PATENT OFFICE.

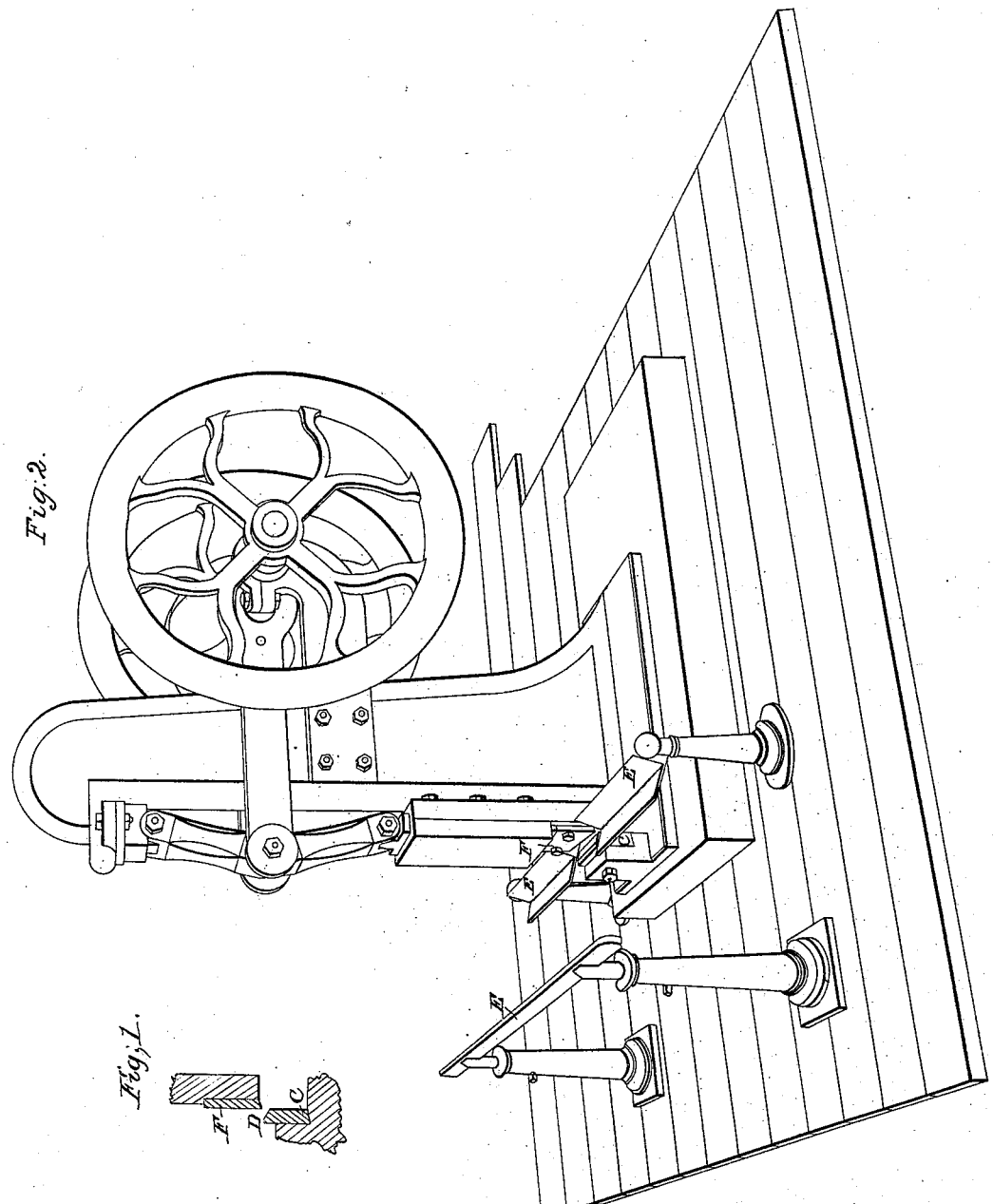

JAMES TETLOW, OF SALEM, MASSACHUSETTS.

MACHINE FOR CUTTING METAL.

Specification of Letters Patent No. 17,813, dated July 14, 1857.

*To all whom it may concern:*

Be it known that I, JAMES TETLOW, of Salem, in the county of Essex and State of Massachusetts, have invented a new form of cutter for cutting a bevel edge to boiler-plate or other metal, by which the under surface, or surface which forms an acute angle with the cut edge of the plate, is left without any indentation or bending from its original plain surface; and I do hereby declare that the same is fully described and represented in the following specification and the accompanying drawings, letters, figures, and references thereof. The said drawings exhibit my invention as applied to a cutting-machine. Figure 2 is a perspective view of said machine and cutter. Fig. 1 is a section of said cutter with parts attached, similar letters referring to like parts.

The boiler plate or other metal to be cut is passed along the guides E, E, E, Fig. 2, from left to right. The obtuse angle of the cutter C is such that one of its surfaces D presents the whole of its surface to the plate, while the cutter F cuts the plate off at an acute angle.

I would remark that I do not claim the machine or combination of levers or joints and slides for operating the cutter; but What I do claim as my invention and desire to secure by Letters Patent is—

The forming the cutter C with an obtuse angle in such a manner as to give to the surface of the plate while being cut a broad flat bearing D to rest upon while the other cutter F is cutting through the plate, the obtuse angle of the cutter C being the supplement of the acute angle of the plate when cut.

JAMES TETLOW. [L. S.]

Witnesses:
   GEO. L. NEWCOMB,
   JOSEPH G. WATERS.